United States Patent
Nahman et al.

(10) Patent No.: US 10,838,690 B2
(45) Date of Patent: *Nov. 17, 2020

(54) WEARABLE SOUND SYSTEM WITH CONFIGURABLE PRIVACY MODES

(71) Applicant: Harman International Industries, Incorporated, Stamford, CT (US)

(72) Inventors: Jaime Elliot Nahman, Oakland, CA (US); Stefan Marti, Oakland, CA (US); Davide Di Censo, Sunnyvale, CA (US); Mirjana Spasojevic, Palo Alto, CA (US); Joseph Verbeke, San Francisco, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/711,179

(22) Filed: Dec. 11, 2019

(65) Prior Publication Data
US 2020/0117420 A1    Apr. 16, 2020

Related U.S. Application Data

(63) Continuation of application No. 15/880,495, filed on Jan. 25, 2018, now Pat. No. 10,540,138.

(51) Int. Cl.
| | |
|---|---|
| *G06F 3/16* | (2006.01) |
| *H04R 27/04* | (2006.01) |
| *H04R 1/34* | (2006.01) |
| *H04R 1/10* | (2006.01) |
| *H04S 7/00* | (2006.01) |
| *H04R 5/033* | (2006.01) |

(Continued)

(52) U.S. Cl.
CPC .............. *G06F 3/165* (2013.01); *G06F 3/167* (2013.01); *H04R 1/1041* (2013.01); *H04R 1/1091* (2013.01); *H04R 1/345* (2013.01); *H04R 27/04* (2013.01); *H04R 3/12* (2013.01); *H04R 5/033* (2013.01); *H04R 27/00* (2013.01); *H04R 2201/003* (2013.01); *H04R 2420/07* (2013.01); *H04R 2460/13* (2013.01); *H04S 7/30* (2013.01)

(58) Field of Classification Search
CPC combination set(s) only.
See application file for complete search history.

(56) References Cited

U.S. PATENT DOCUMENTS

| | | | |
|---|---|---|---|
| 5,684,879 A | 11/1997 | Verdick | |
| 8,014,733 B1 * | 9/2011 | Gailloux | H04B 1/385 455/90.3 |

(Continued)

FOREIGN PATENT DOCUMENTS

| | | |
|---|---|---|
| WO | 2015/108824 A1 | 7/2015 |
| WO | 2017/003472 A1 | 1/2017 |

*Primary Examiner* — Duc Nguyen
*Assistant Examiner* — Assad Mohammed
(74) *Attorney, Agent, or Firm* — Artegis Law Group, LLP

(57) ABSTRACT

An audio sharing system is configured to operate in at least two modes of operation. In a private mode, the audio sharing system outputs sound only to a user and may isolate the user from the surrounding acoustic environment. In a public mode of operation, the audio sharing system broadcasts sound to the user and to any other listeners in proximity to the user, thereby sharing sound in a social manner. The audio sharing system may also operate in other modes of operation that allow the selective sharing of sounds.

20 Claims, 17 Drawing Sheets

(51) Int. Cl.
*H04R 27/00* (2006.01)
*H04R 3/12* (2006.01)

(56) References Cited

U.S. PATENT DOCUMENTS

| | | | | |
|---|---|---|---|---|
| 2006/0262935 A1* | 11/2006 | Goose | H04S 3/002 | 381/17 |
| 2008/0166002 A1* | 7/2008 | Amsel | H04R 5/033 | 381/370 |
| 2012/0219165 A1* | 8/2012 | Yamada | H04R 1/1091 | 381/310 |
| 2013/0129103 A1* | 5/2013 | Donaldson | G10K 11/175 | 381/71.1 |
| 2013/0231937 A1 | 9/2013 | Woodall et al. | | |
| 2013/0262298 A1* | 10/2013 | Morley | H04M 1/05 | 705/39 |
| 2014/0064526 A1* | 3/2014 | Otto | H04S 5/00 | 381/300 |
| 2014/0270321 A1* | 9/2014 | Fullam | H04R 1/028 | 381/387 |
| 2014/0369544 A1 | 12/2014 | Flynn | | |
| 2015/0125023 A1* | 5/2015 | Blonder | H04R 1/2823 | 381/373 |
| 2016/0088383 A1 | 3/2016 | Yan et al. | | |
| 2016/0205459 A1* | 7/2016 | Kamada | H04R 29/001 | 381/74 |
| 2018/0234765 A1* | 8/2018 | Torok | H04R 3/12 | |
| 2018/0288515 A1* | 10/2018 | Peterson | H04R 1/1008 | |
| 2019/0070439 A1* | 3/2019 | Namm | H04R 1/028 | |

* cited by examiner

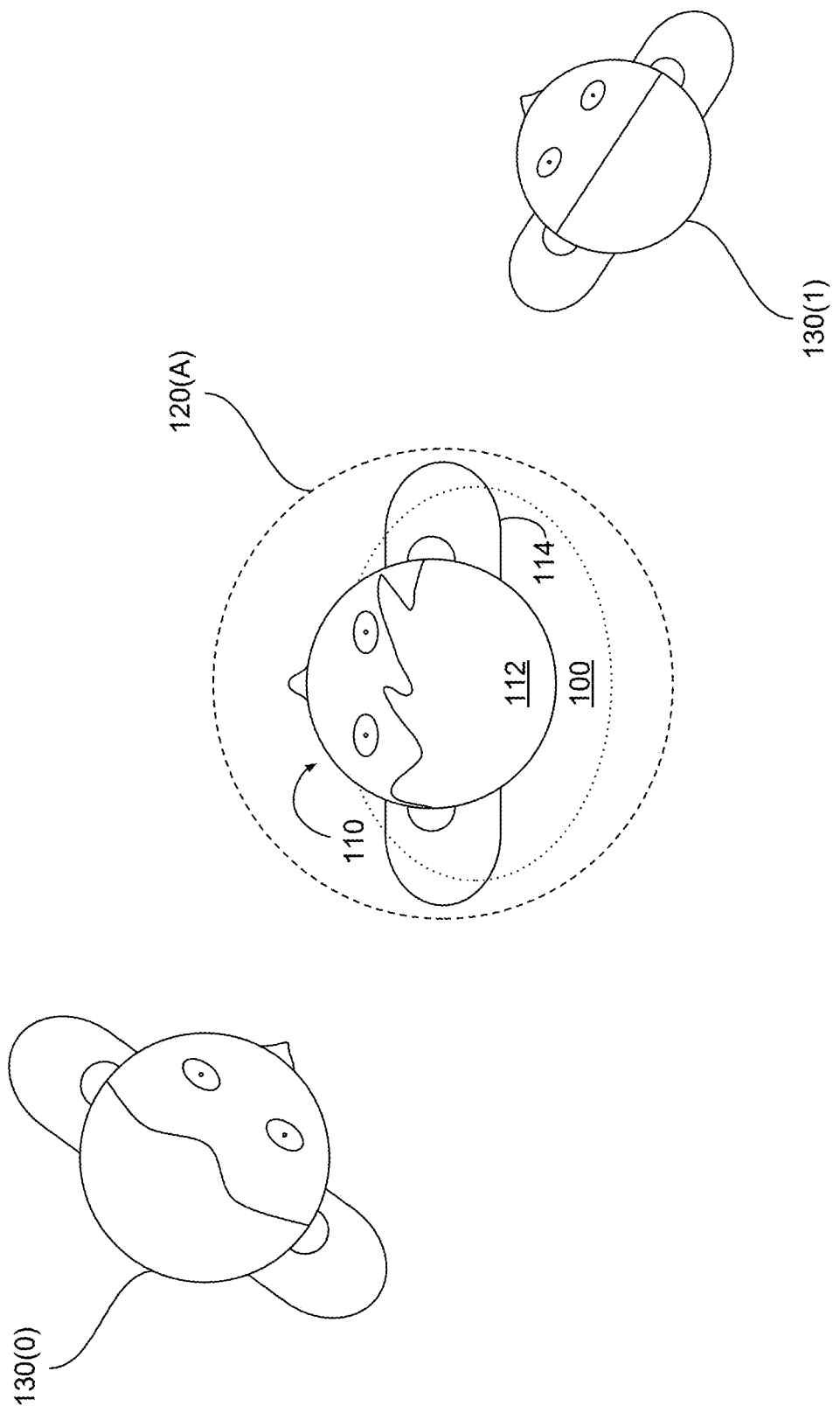

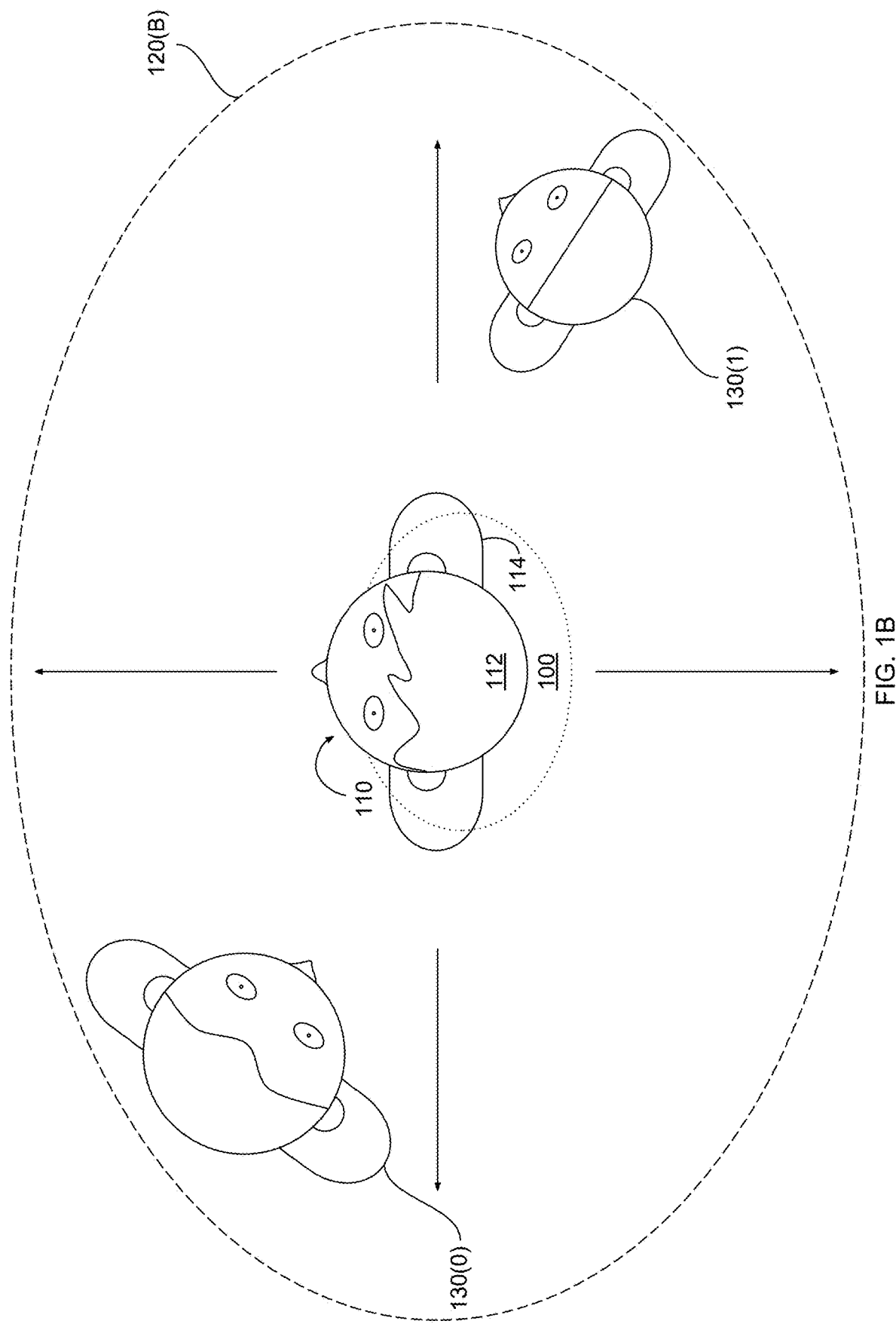

WEARABLE SOUND SYSTEM WITH CONFIGURABLE PRIVACY MODES

CROSS-REFERENCE TO RELATED APPLICATIONS

This application is a continuation of the co-pending U.S. patent application titled, "WEARABLE SOUND SYSTEM WITH CONFIGURABLE PRIVACY MODES," filed on Jan. 25, 2018 and having Ser. No. 15/880,495. The subject matter of this related application is hereby incorporated herein by reference.

BACKGROUND

Field of the Various Embodiments

The various embodiments relate generally to speaker systems and, more specifically, to a wearable sound system with configurable privacy modes.

Description of the Related Art

A conventional personal sound system typically includes an audio device configured to generate audio signals and a set of headphones configured to output sound derived from those audio signals into the ears of a user. For example, a conventional digital music player generates audio signals based on a music file and then transmits those signals to a pair of headphones or earbuds that output sound into the ears of the user.

Conventional personal sound systems function well in the specific context of a user listening to sound in isolation. However, such systems must be adapted to operate in the wider context of a user listening to sound in proximity to others. In particular, in a social setting, a user of a personal sound system may wish to facilitate the shared experience of listening to sound with others.

In such situations, users of personal sound systems oftentimes share one headphone or earbud with other listeners. Such approaches can be cumbersome, though, because headphone wires are usually too short to allow comfortable listening and may become tangled easily. In addition, when using only one headphone or earbud, any stereo effects are lost, resulting in a much less immersive listening experience. Further, such approaches enable sound to be shared between no more than two people. Thus, as a general matter, conventional personal sound systems cannot easily be used with multiple listeners.

As the foregoing illustrates, a more effective approach to sharing sound across multiple listeners would be useful.

SUMMARY

One or more embodiments set forth a computer-implemented method for distributing sound between listeners, including configuring one or more acoustic transducers to operate in a first mode, where, in the first mode, the one or more acoustic transducers generate a first sound field in which sound is output towards a first listener and away from a second listener, transitioning the one or more acoustic transducers from the first mode to a second mode in response to a first triggering event, and configuring the one or more acoustic transducers to operate in the second mode, where, in the second mode, the one or more acoustic transducers generate a second sound field in which sound is output towards the first listener and the second listener.

Further embodiments provide, among other things, a system and a computer-readable medium configured to implement the method set forth above.

One advantage of the techniques described herein is that users of the audio sharing system can listen to sound in isolation from others at some times, and selectively share sound with nearby listeners at other times.

BRIEF DESCRIPTION OF THE SEVERAL VIEWS OF THE DRAWINGS

So that the manner in which the above recited features can be understood in detail, a more particular description of the various embodiments, briefly summarized above, may be had by reference to certain embodiments, some of which are illustrated in the appended drawings. It is to be noted, however, that the appended drawings illustrate only typical embodiments and are therefore not to be considered limiting of scope, for the contemplated embodiments may admit to other equally effective embodiments.

FIGS. 1A-1E illustrate an audio sharing system configured to implement one or more aspects of the various embodiments;

DETAILED DESCRIPTION

In the following description, numerous specific details are set forth to provide a more thorough understanding of the various embodiments. However, it will be apparent to one of skill in the art that various embodiments may be practiced without one or more of these specific details.

As discussed above, conventional personal sound systems are specifically designed to emit audio to one listener in isolation from others, and therefore cannot easily be used in social contexts. Specifically, conventional personal sound systems do not have any inbuilt mechanism for sharing audio between multiple listeners.

To address this issue, various embodiments include an audio sharing system configured to operate in at least two modes of operation. In a private mode, the audio sharing system outputs sound only to the user and may isolate the user from the surrounding acoustic environment. In a public mode of operation, the audio sharing system broadcasts sound to the user and to any other listeners in proximity to the user, thereby sharing sound in a social manner. The audio sharing system may also operate in other modes of operation that allow the selective sharing of sounds. One advantage of the techniques described herein is that users of the audio sharing system can listen to sound in isolation from others at some times, and selectively share sound with nearby listeners at other times.

Conceptual Overview

Figure 1C:
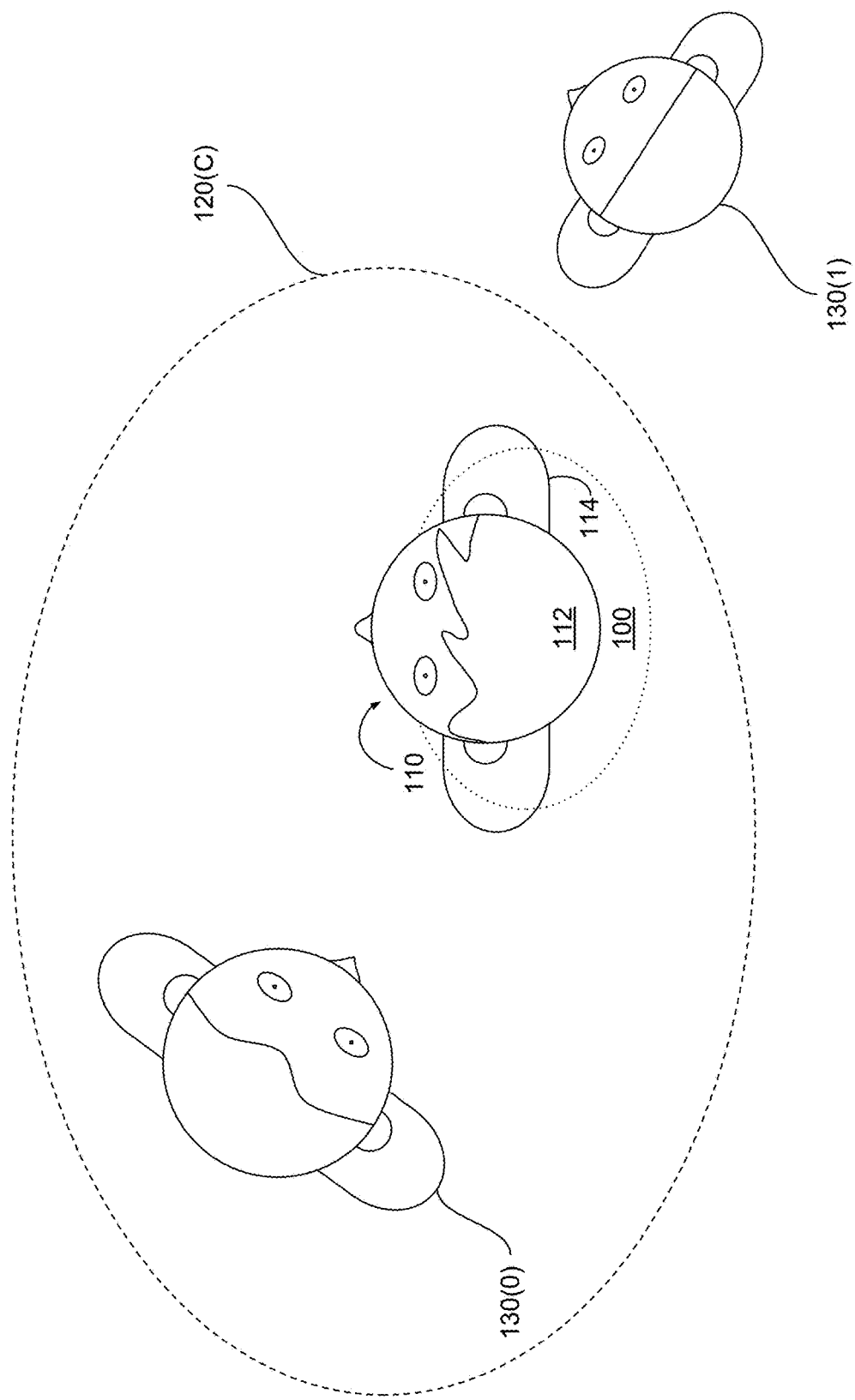

FIGS. 1A-1E illustrate an audio sharing system configured to implement one or more aspects of the present embodiments. As shown in FIG. 1A, audio sharing system 100 is configured to be worn by a user 110. In particular, components of audio sharing system 100 may be coupled with the head 112 and/or shoulders 114 of user 110. Other components of audio sharing system 100 can be stored in the clothing of user or carried by user, among other options. Various implementations of audio sharing system are discussed in greater detail below in conjunction with FIGS. 2A-3D.

In operation, audio sharing system 100 is configured to emit sound to generate a sound field 120(A). In this configuration, audio sharing system 100 operates in a "private" mode of operation and therefore generates sound field 120(A) in the immediate proximity of user 110. When operating in private mode, audio sharing system 100 may implement directional sound techniques to direct sound targeting user 110 and to avoid emitting sound that can be perceived by nearby listeners 130(0) and 130(1). These directional sound techniques may involve beamforming and/or steerable sound arrays, as discussed specifically in conjunction with FIGS. 2A-2D. These directional sound techniques may also involve mechanical approaches to directing sound, as discussed specifically in conjunction with FIGS. 3A-3D.

In response to various triggering events, audio sharing system 100 is configured to transition between different modes of operation. A triggering event may be identified based on input received from user 110, or input received from the environment surrounding user 110. For example, and without limitation, audio sharing system 100 could transition between modes of operation in response to voice commands received from user 110. Alternatively, audio sharing system 100 could transition between modes of operation upon identifying other nearby listeners. Other triggering events are discussed in greater detail below in conjunction with FIGS. 4A-4B. Additional modes of operation are discussed below.

Audio sharing system 100 may generate different sound fields corresponding to each different mode of operation. FIG. 1B illustrates a sound field generated when audio sharing system 100 operates in a "public" mode of operation.

As shown in FIG. 1B, audio sharing system 100 is configured to generate a sound field 120(B) when operating in public mode. Sound field 120(B) represents an expanded version of sound field 120(A). Sound field 120(B) may be perceptible by user 110 as well as listeners 130(0) and 130(1). In this manner, audio sharing system 100 facilitates the sharing of sound in a social context, thereby overcoming restrictions associated with conventional personal sound systems.

Audio sharing system 100 may also generate more precisely formed sound fields. FIG. 1C illustrates a sound field generated when audio sharing system 100 operates in a "selective" mode of operation.

As shown in FIG. 1C, audio sharing system 100 is configured to generate a sound field 120(C) when operating in selective mode. Sound field 120(C) is precisely formed to be perceptible by user 110 and listener 130(0) and may not be perceptible by listener 130(1). This approach may be implemented in a social context that includes subgroupings of listeners. For example, and without limitation, user 110 and listeners 130 could collectively share a public space, although user 110 and listener 130(0) could form a subgroup, such as a conversational grouping, that does not include listener 130(1). Accordingly, user 110 could wish to share sound with listener 130(0) without disturbing or including listener 130(1).

Figure 1D:
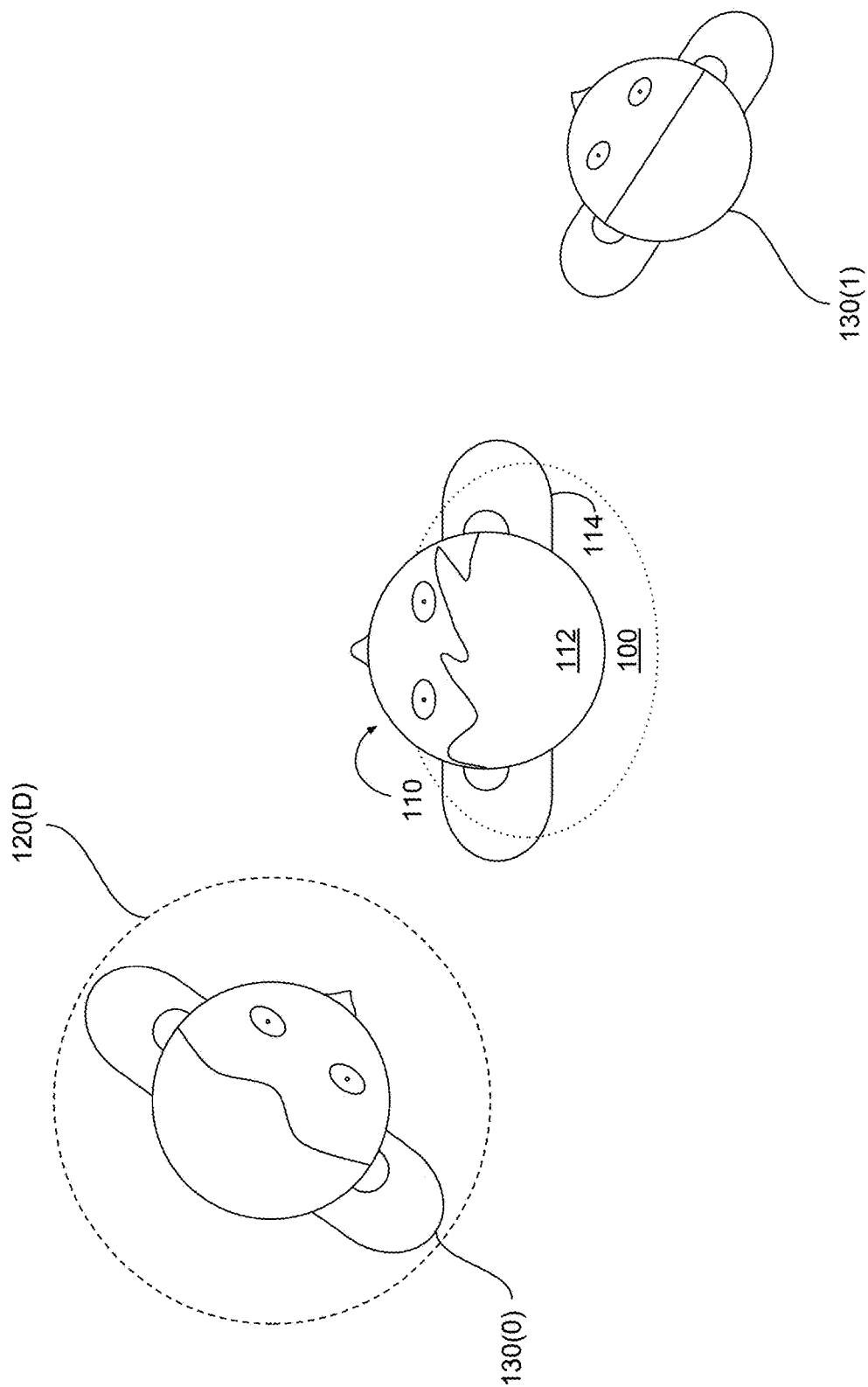

Audio sharing system 100 may also generate focused sound fields targeting specific listeners. FIG. 1D illustrates a sound field generated when audio sharing system 100 operates in a "spotlight" mode of operation.

As shown in FIG. 1D, audio sharing system 100 is configured to generate sound field 120(D) when operating in spotlight mode. Sound field 120(D) specifically targets listener 130(0) and excludes user 110. Accordingly, listener 130(0) may perceive sound generated by audio sharing system 100 and user 110 may not perceive that sound. This particular mode of operation may be implemented when user 110 wishes to share sound with a nearby listener but does not wish to hear that sound. For example, and without limitation, user 110 could wish to share a voice message with listener 130(0). User 110 could have already listened to that voice message and therefore wish to avoid listening to the message again. Thus, user 110 would cause audio sharing system 100 to generate sound field 120(D) targeting listener 130(0) and excluding user 110.

Figure 1E:
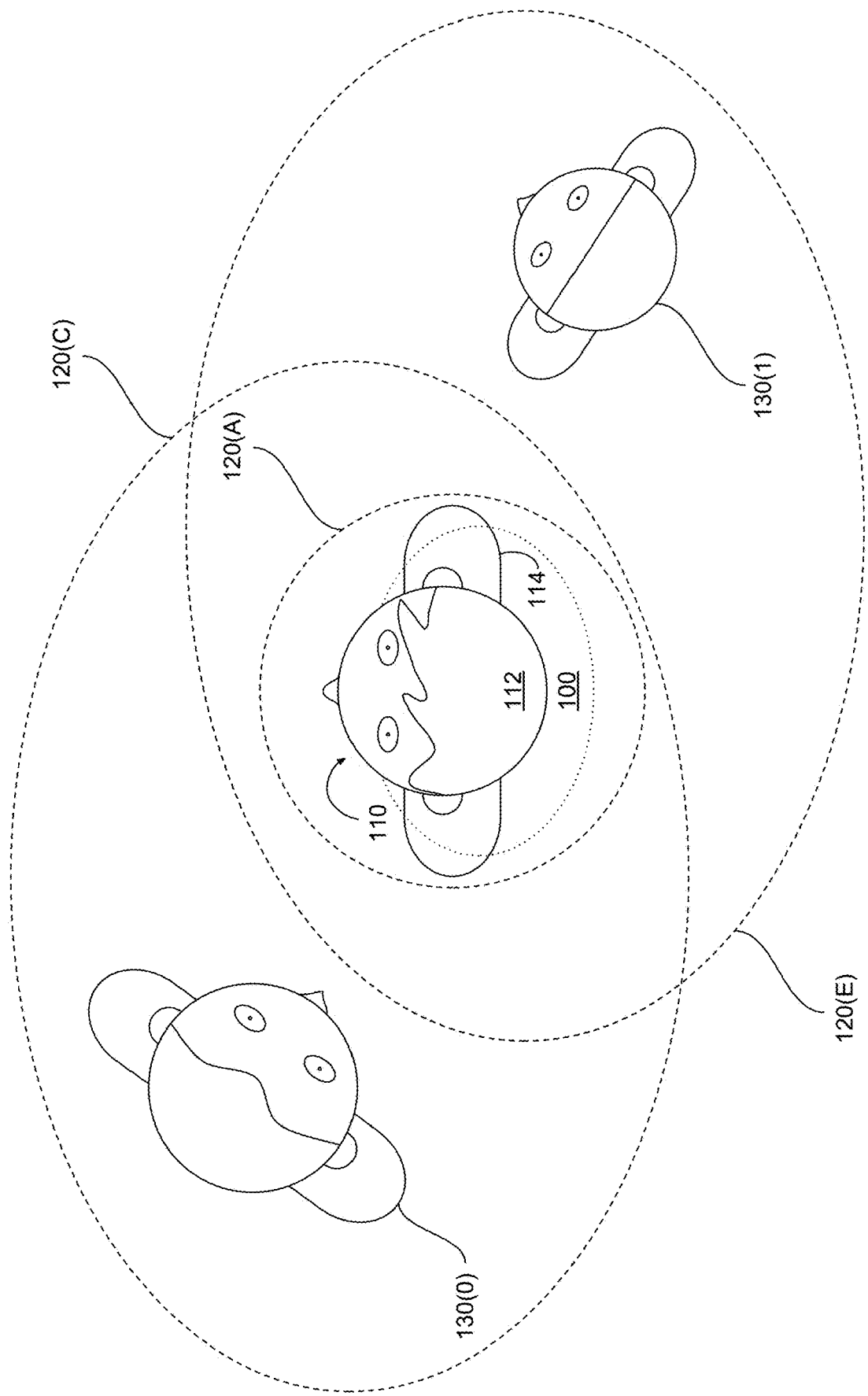

Audio sharing system 100 may also generate multiple sound fields simultaneously. FIG. 1E illustrates sound fields generated when audio sharing system 100 operates in a "multi" mode of operation.

As shown in FIG. 1E, audio sharing system 100 is configured to generate sound fields 120(A) of FIG. 1A, sound field 120(C) of FIG. 1C, as well as sound field 120(E), simultaneously and in conjunction with one another. These different sound fields target different subgroups of user 110 and listeners 130. In particular, sound field 120(A) targets user 110 and may thus only be perceptible by user 110, as previously discussed. Sound field 120(C) targets both user 110 and listener 130(0), and may thus only be perceptible by user 110 and listener 130(0), as also discussed. In addition, sound field 130(E) targets user 110 and listener 130(1) and may thus only be perceptible by user 110 and listener 130(1).

Each of the different sound fields shown may be derived from a different source of audio or may be derived from a common audio source modulated with different settings. For example, and without limitation, sound field 120(A) could represent audio associated with a personal digital assistant that user 110 wishes to keep private. Further, sound field 120(C) could represent audio to which listener 130(0) has expressed interest in listening, while sound field 120(E) could represent different audio to which listener 130(1) has expressed interest in listening. In another example, sound field 120(C) could be derived from a specific audio source and emitted with a first volume level, while sound field 120(E) could also be derived from that same audio source although be emitted with a second volume level. In one embodiment, a given listener 130 may interact with audio sharing system 100 to configure settings that are specifically applied to sound fields associated with that listener 130. In the manner discussed herein, audio sharing system 100 is configured to operate in multiple different modes simultaneously to generate different sound fields 120 in conjunction with one another.

In one embodiment, audio sharing system 100 generates and manages sound fields associated with multiple different conversational agents simultaneously. The different sound fields corresponding to each different conversational agent may be directed towards different groups of listeners. Each group of listeners may interact with a different conversational agent via the associated sound field. Audio sharing system 100 may coordinate conversations between these different groups of listeners and the corresponding conversational agents independently of one another. Alternatively, audio sharing system 100 may direct each different conversation based on the other conversations. In one example, without limitation, audio sharing system 100 may converse with a user who resides inside an automobile, and also converse with a pedestrian outside of the vehicle. These two conversations could occur via two different conversational agents that may or may not interact with one another (transparently to the user, in some cases), or via a single conversational agent.

Referring generally to FIGS. 1A-1E, when generating any of the sound fields 120 discussed above, audio sharing system 100 may perform digital signal processing or other sound modulation techniques to implement additional functionalities, as described in greater detail herein.

In one embodiment, audio sharing system 100 may generate modulated sound that appears, for a given listener (e.g., user 110 and/or listeners 130), to be emitted from a specific direction. For example, and without limitation, when generating sound field 120(A) shown in FIG. 1A, audio sharing system 100 could modulate sound field 120(A) so that sound appears to originate from a specific location in the environment surrounding user 110. Audio sharing system 100 could also modulate sound field 120(A) to preserve this localized effect when user 110 moves through the environment. In this manner, audio sharing system 100 can simulate sources of sound that remain fixed in the surrounding environment.

In another embodiment, audio sharing system 100 may generate modulated sound to produce a sound field 120 that moves and/or changes shape over time. For example, and without limitation, when generating sound field 120(C) shown in FIG. 1C, audio sharing system 100 could modulate sound field 120(C) when listener 130(0) moves relative to user 110 in order to continue emitting sound specifically to user 110 and listener 130(0) during this movement.

In yet another embodiment, audio sharing system 100 may generate modulated sound that selectively incorporates environmental sounds into a sound field. For example, and without limitation, when generating sound field 120(A) shown in FIG. 1A, audio sharing system 100 could modulate sound field 120(A) to include environmental sounds emitted from nearby traffic, thereby providing user 110 with a certain degree of situational awareness.

As mentioned previously, audio sharing system 100 may include various types of audio devices configured to emit sound in a directional manner to generate sound fields 120. FIGS. 2A-2D and 3A-3D, respectively, set forth two examples of such devices.

Exemplary Audio Devices

FIGS. 2A-2D illustrate exemplary shoulder and/or neck mounted audio devices associated with the audio sharing system of FIG. 1, according to various embodiments. As shown in each of FIGS. 2A-2B, user 110 wears a steerable acoustic array 200 on shoulder 114. Steerable acoustic array 200 includes a collection of acoustic transducers configured to interoperate to generate highly directional sound, thereby allowing the formation of precisely shaped sound fields. Steerable acoustic array 200 could include, for example and without limitation, a set of microelectromechanical system (MEMS) devices, a set of ultrasonic transducers, or a set of micro-acoustic devices, among other possibilities.

Figure 2A:
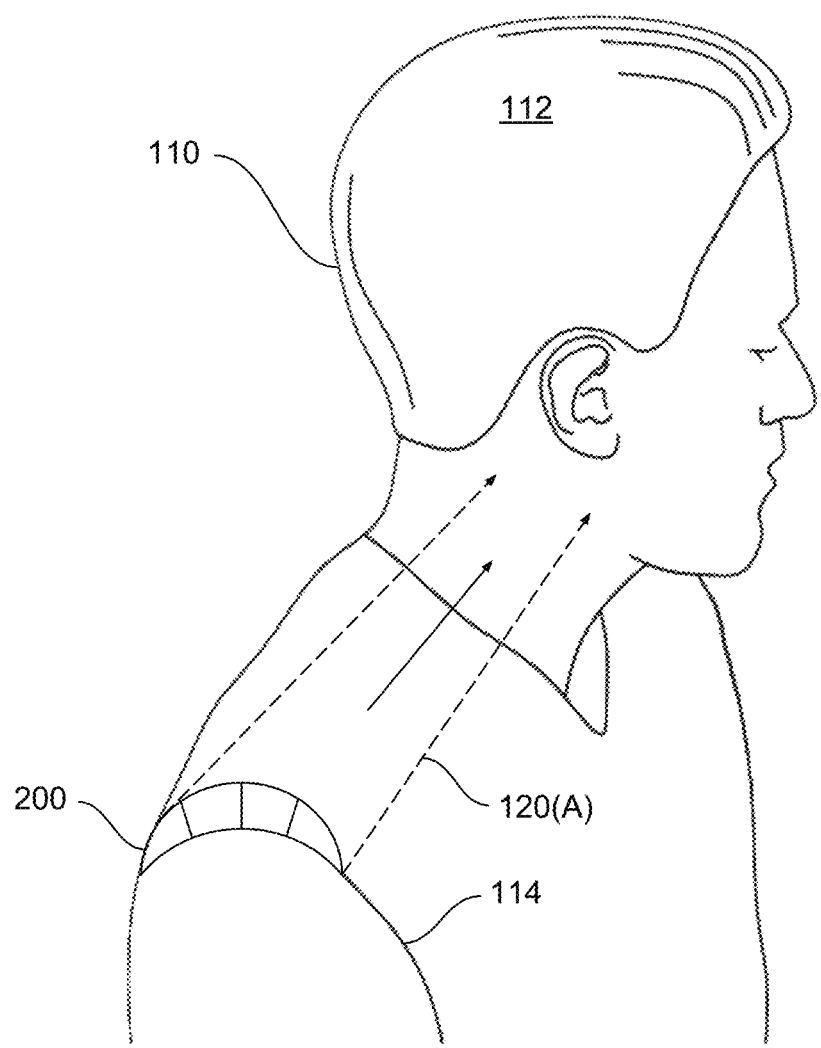
FIGS. 2A-2D illustrate exemplary shoulder-mounted audio devices associated with the audio sharing system of FIG. 1, according to various embodiments.

As shown in FIG. 2A, via steerable acoustic array 200, audio sharing system 100 may generate sound field 120(A) that specifically targets the ear of user 110 and avoids emitting sound elsewhere. This configuration corresponds to the private mode of operation discussed previously. Audio sharing system 100 may then transition to public mode and adjust the output of steerable acoustic array 200 accordingly.

Figure 2B:
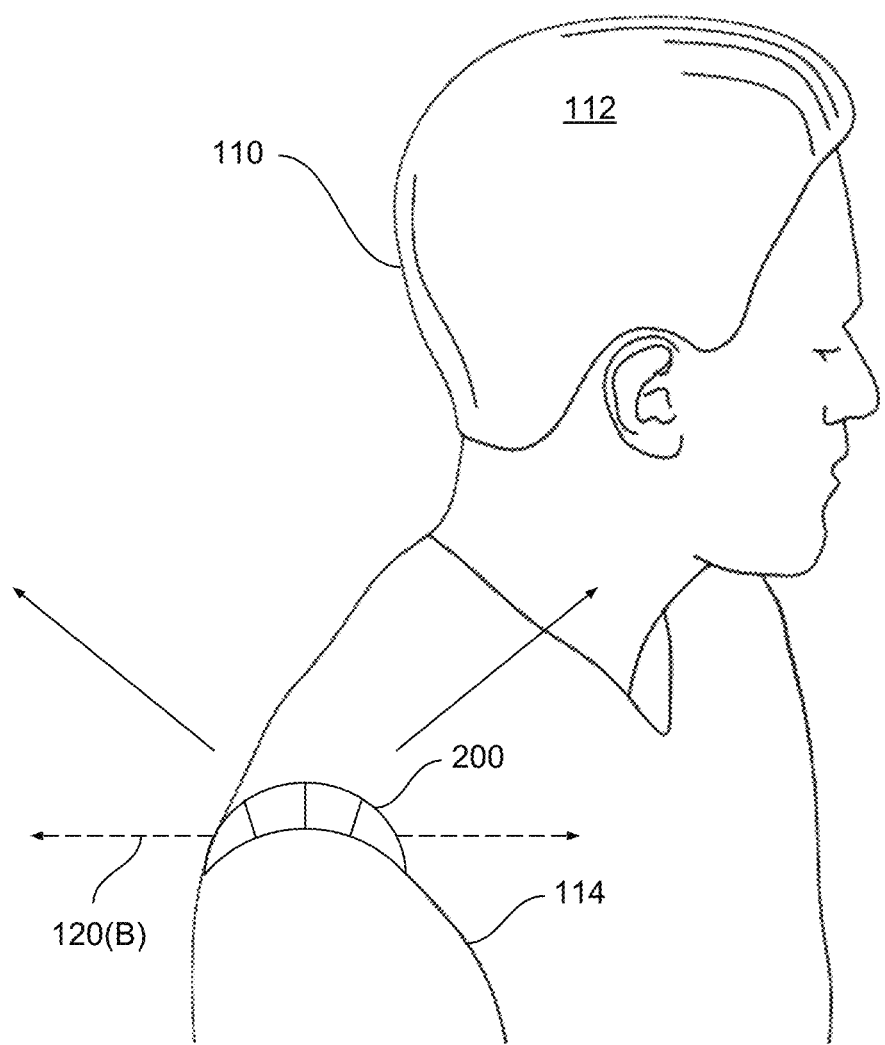
Figure 2C:
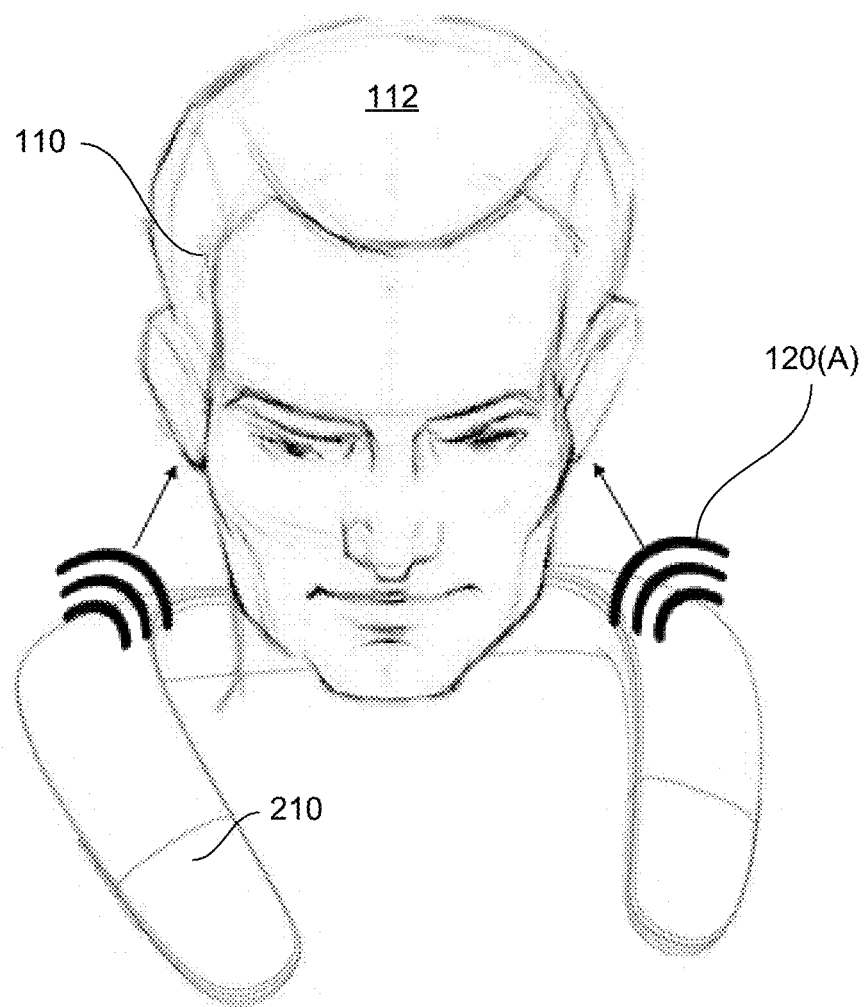
Figure 2D:
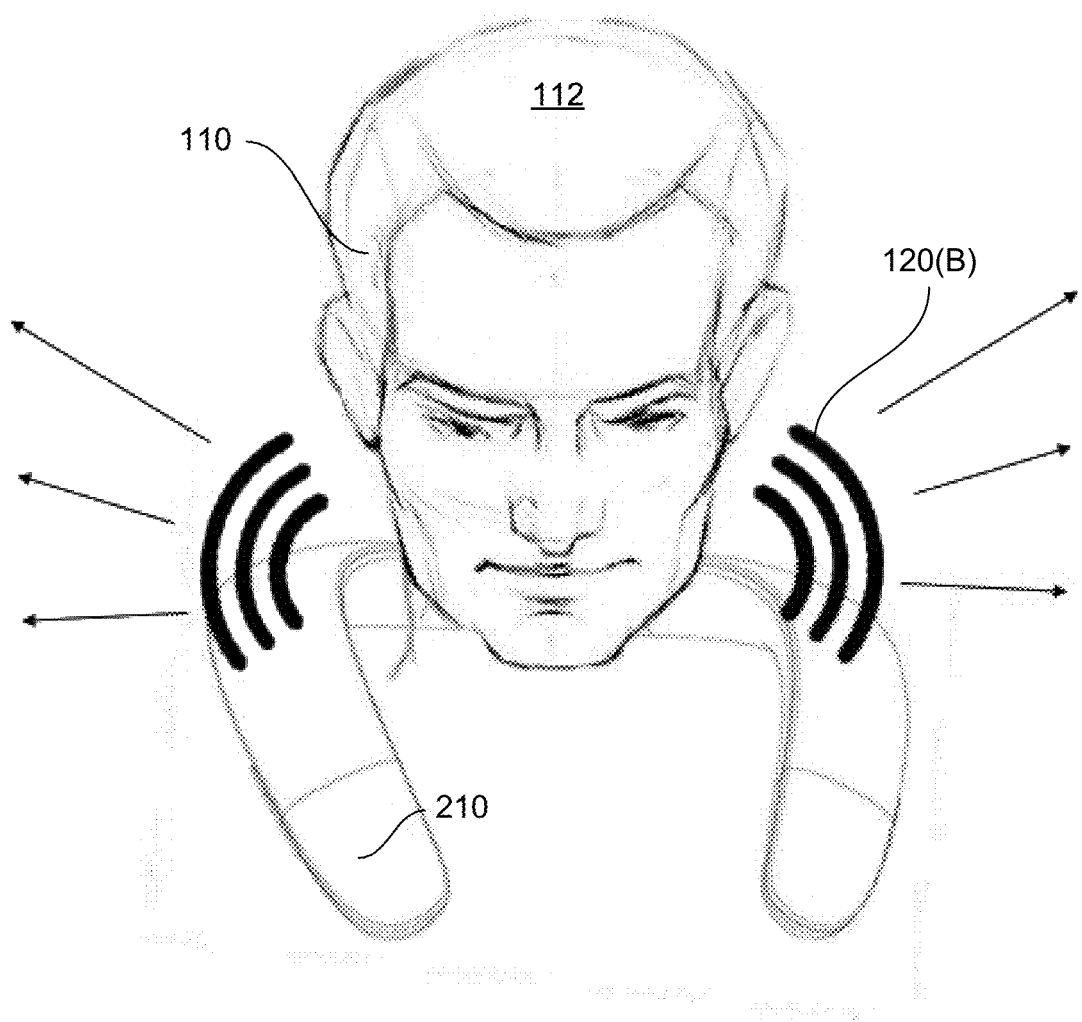

As shown in FIG. 2B, via steerable acoustic array 200, audio sharing system may then generate sound field 120(B) to broadcast sound multidirectionally, thereby allowing nearby listeners 130 to listen to shared audio. This configuration corresponds to the public mode of operation discussed previously. FIGS. 2B-2D depict another implementation of audio devices associated with audio sharing system 100.

As shown in FIGS. 2C-2D, user 110 wears a neck-mounted acoustic array 210. Neck-mounted acoustic array 210 may include a collection of acoustic transducers configured to interoperate to generate highly directional sound, thereby allowing the formation of precisely shaped sound fields, similar to steerable acoustic array 200 of FIGS. 2A-2B. Via neck mounted acoustic array 210, audio sharing system 100 may generate sound field 120(A) when operating in private mode, as shown in FIG. 2C. Audio sharing system 100 may then transition to public mode and generate sound field 120(B), as shown in FIG. 2D. Audio sharing system 100 may also include audio devices that can be mounted to head 112 of user 110, as described in greater detail below in conjunction with FIGS. 3A-3D.

FIGS. 3A-3D illustrate exemplary head-mounted audio devices associated with the audio sharing system of FIG. 1, according to various embodiments. As shown in each of FIGS. 3A-3B, user 110 wears robotic hat 300 on head 112. Robotic hat 300 includes mechanical flaps 310 configured to fold between a folded-down position and a folded-up position. Mechanical flaps may include actuators, electric motors, servomechanisms, steppers, solenoids, or other robotic elements configured to effect translation and/or rotation. Mechanical flaps may also actuate via shape change materials, including shape memory alloys, shape memory polymers, thermoplastics, dielectric electroactive polymers, and so forth.

Figure 3A:
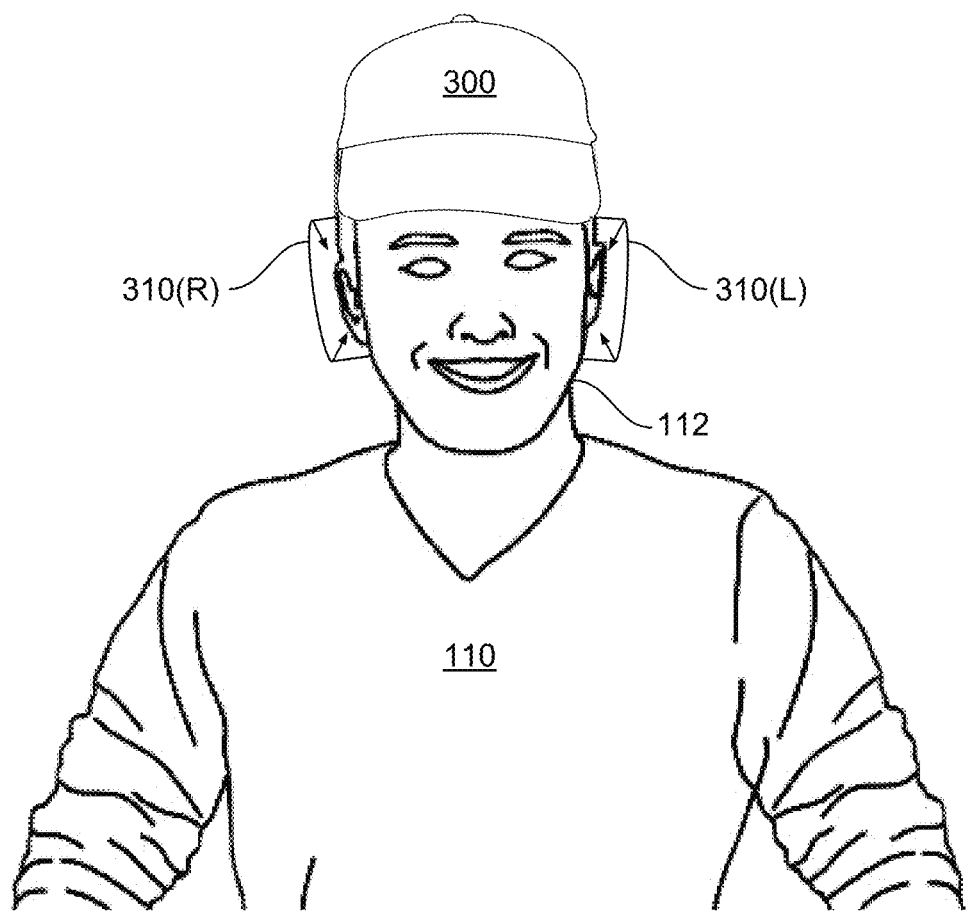
FIGS. 3A-3D illustrate exemplary head-mounted audio devices associated with the audio sharing system of FIG. 1, according to various embodiments.
Figure 3B:
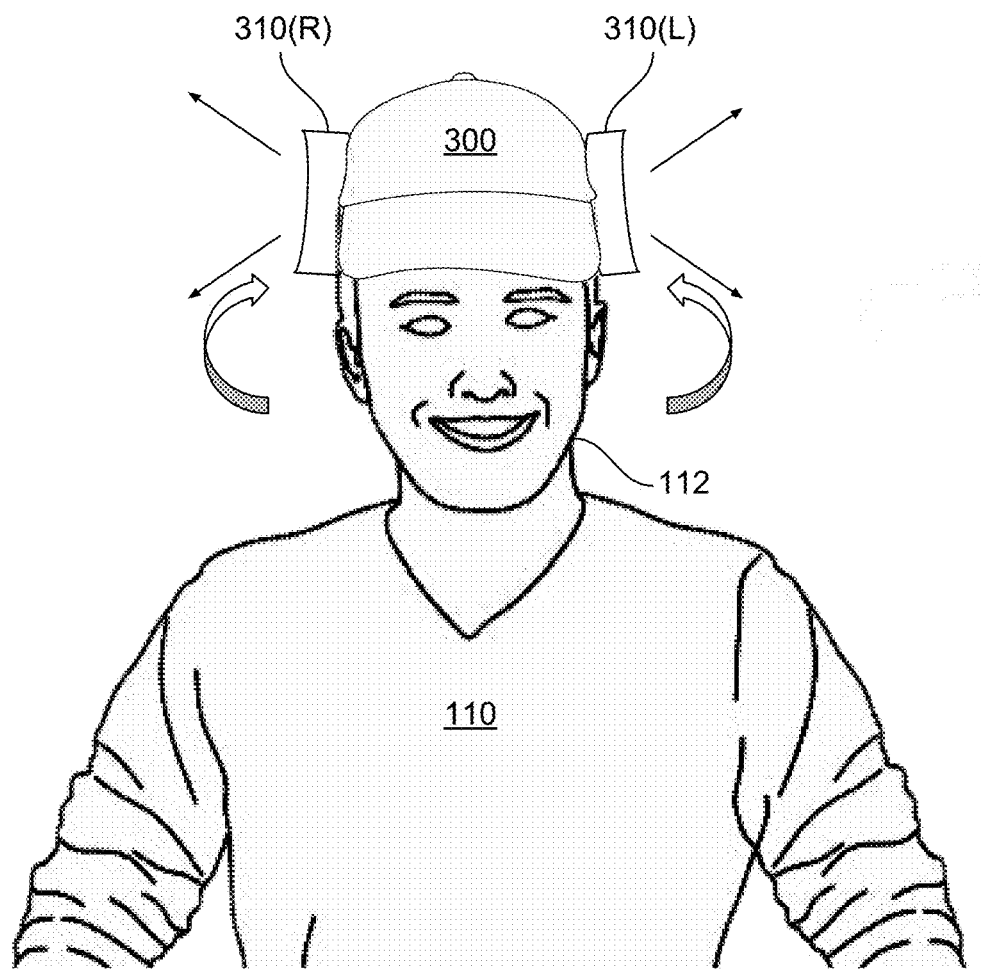

When mechanical flaps are configured in the folded down position, as shown in FIG. 3A, each mechanical flap 310 covers a different ear of user 110 and directs sound into the respective ear. In this configuration, audio sharing system 100 operates in private mode and emits limited sound to the environment surrounding user 110. When mechanical flaps 310 are configured in the folded-up position, as shown in FIG. 3B, each mechanical flap 310 faces outwards and directs sound into the surrounding environment. In this configuration, audio sharing system 100 operates in public mode.

In one embodiment, robotic hat 300 may further include one or more display screens coupled to a mechanically actuated brim of robotic hat 300. This mechanically actuated brim may fold downwards to present a first display screen to user 110. A second display screen on the opposite side of the brim may also be visible to other nearby listeners when the mechanically actuated brim is folded downwards. Audio sharing system 100 may selectively display visual content on either or both of these display screens depending on the current mode of operation. For example, and without limitation, when operating in private mode, audio sharing system 100 may display visual content only on the first display screen and therefore only to user 110. When operation in public mode, however, audio sharing system 100 may also display visual content on the second display screen. In a related embodiment, robotic hat 300 may be a fully-featured augmented reality (AR) device or virtual reality (VR) device configured to transition between a private mode, where user 110 is partially or fully immersed in a simulated reality, and a public mode, where aspects of the simulated reality are shared with nearby listeners. Persons skilled in the art will recognize that the techniques associated with robotic hat 300 may also be implemented in the context of other forms of clothing and wearable items, including jacket collars, scarves, necklaces, backpacks, and so forth, for example and without limitation. Any of the embodiments involving video displays discussed above may also be combined with any of the audio-related embodiments discussed previously, as well.

Figure 3C:
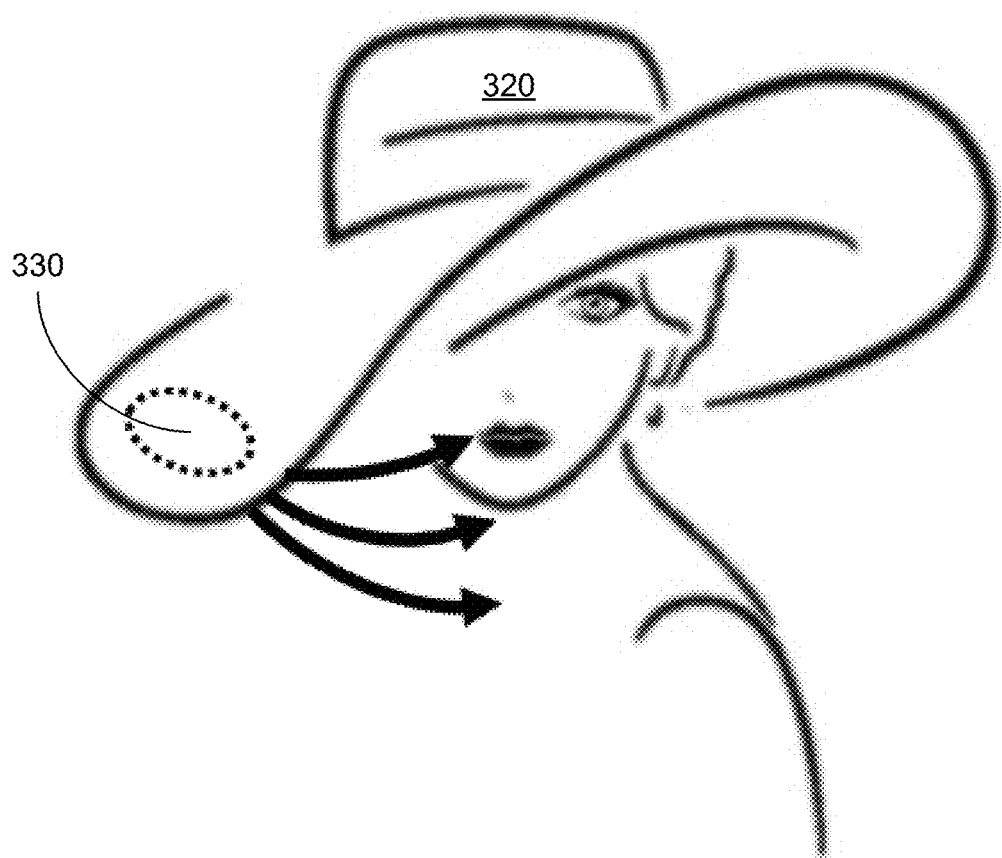
Figure 3D:
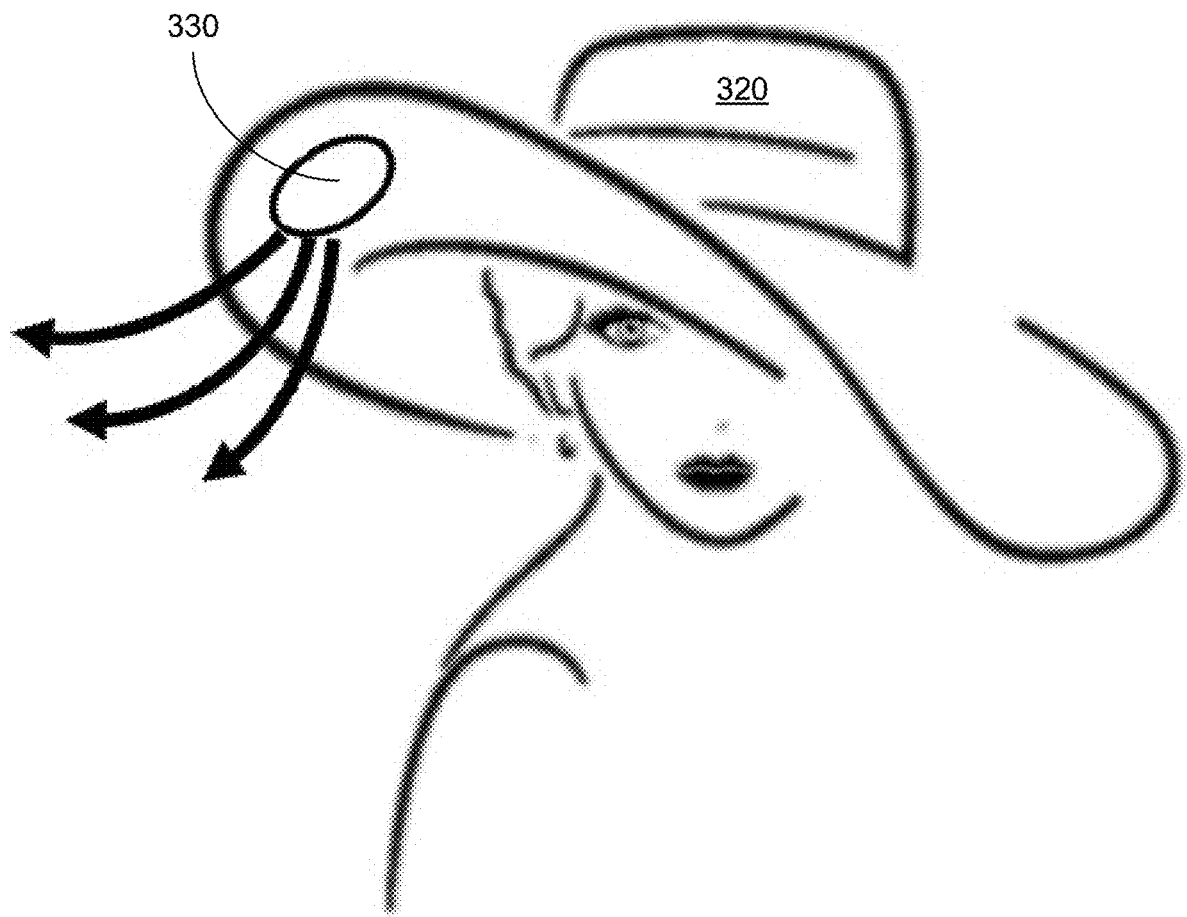

As shown in FIGS. 3C-3D, the mechanisms discussed above in conjunction with FIGS. 3A-3B may also be applied to other types of hats. In particular, hat 320 shown in FIGS. 3C-3D may include a speaker 330. When the brim of hat 320 is folded downwards, as shown in FIG. 3C, audio sharing system 100 operates in private mode. Then, when the brim of hat 320 is folded upwards, as shown in FIG. 3D, audio sharing system 100 operates in public mode.

Referring generally to FIGS. 2A-3D, the audio devices discussed in conjunction with these Figures may be implemented in combination with one another to generate any of the sound fields discussed above in conjunction with FIGS. 1A-1E. In addition, the audio devices described above may also be implemented in combination with various digital signal processing techniques to generate any of the described sound fields.

As a general matter, audio sharing system 100 performs specific configurations to transition between modes of operation via any technically feasible approach or combination of approaches. For example, and without limitation, audio sharing system 100 could implement mechanical actuations such as those described above or could perform digital signal processing techniques such as those also mentioned previously. Additionally, audio sharing system 100 could implement both mechanical and digital signal processing techniques in conjunction with one another, among other possibilities. With any of these techniques, audio sharing system 100 configures one or more audio output devices to implement any and all combinations of the sound fields 120 discussed above.

Various computing components included in audio sharing system 100 are described in greater detail below in conjunction with FIGS. 4A-4B.

System Overview

Figure 4A:
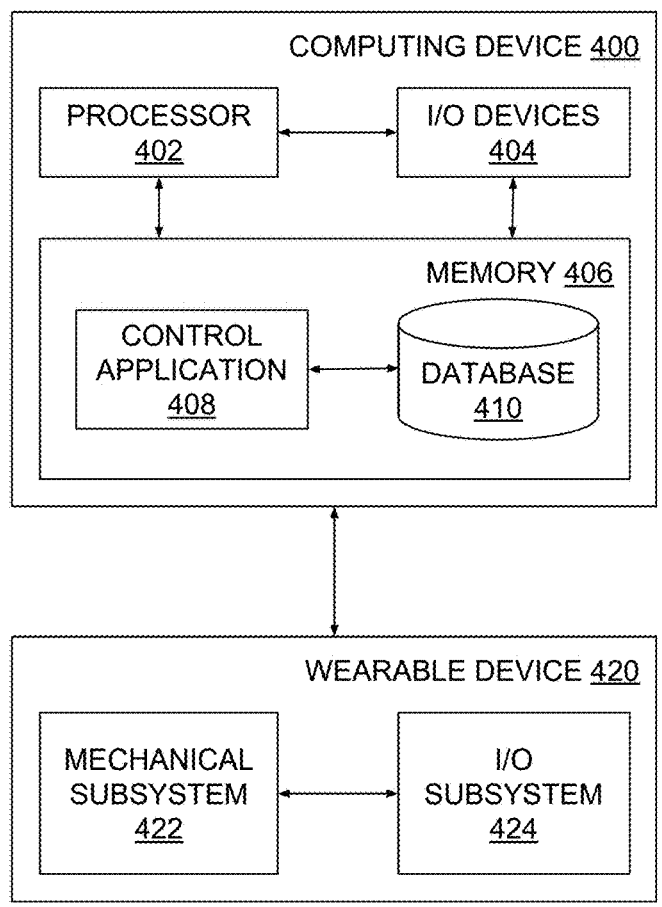
FIGS. 4A-4B are more detailed illustrations of the audio sharing system of FIG. 1, according to various embodiments.
Figure 4B:
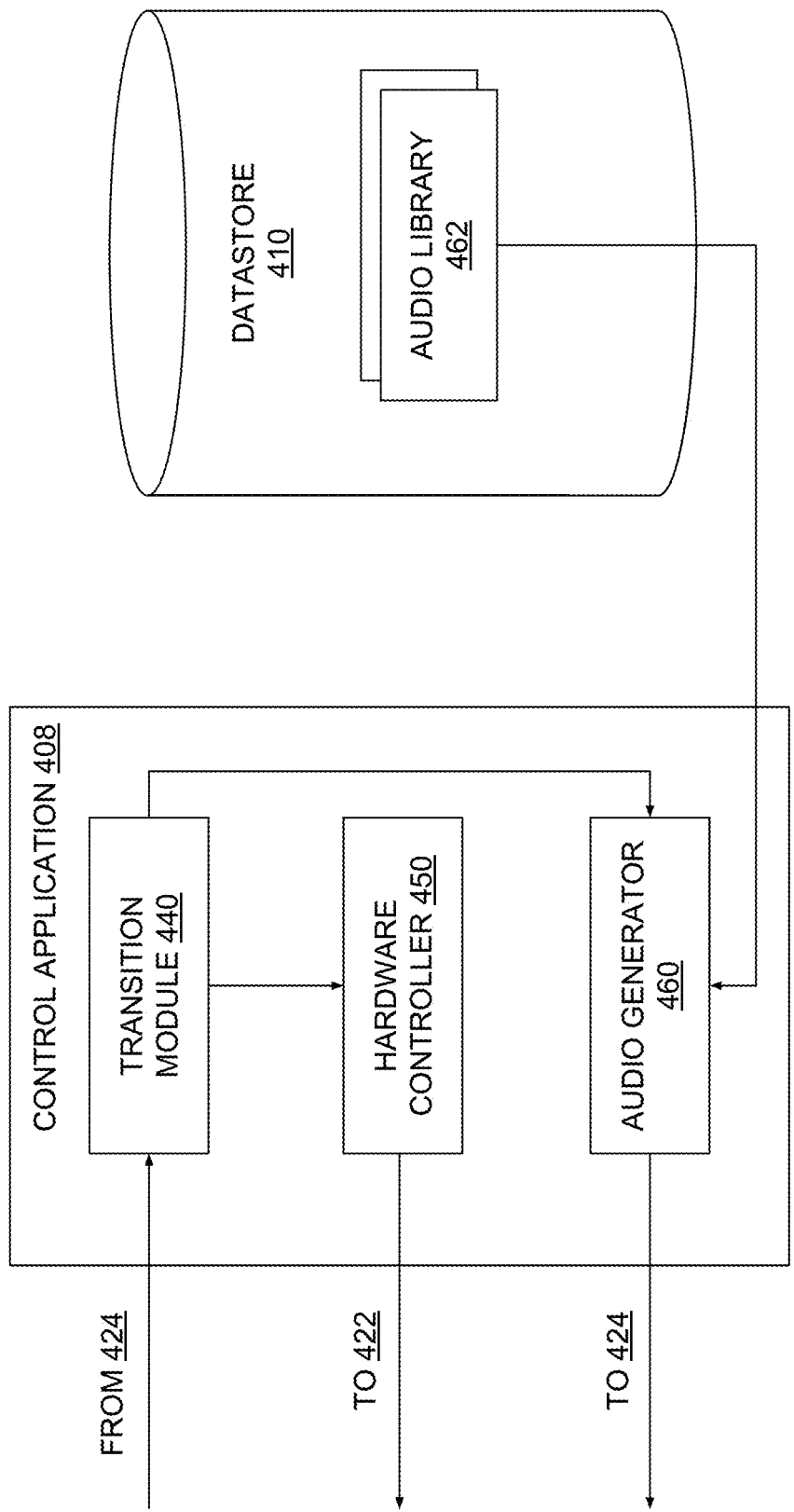

FIGS. 4A-4B are more detailed illustrations of the audio sharing system of FIG. 1, according to various embodiments. As shown, audio sharing system 100 includes a computing device 400 coupled to a wearable device 420. Computing device 400 includes a processor 402, input/output (I/O) devices 404, and memory 406, coupled together.

Processor 402 may be any technically feasible hardware unit configured to process data and execute program instructions. Processor 402 could be, for example and without limitation, a central processing unit (CPU), a graphics processing unit (GPU), an application specific integrated circuit (ASIC), and any combination thereof. I/O devices 404 include devices for receiving input, devices for providing output, and devices for both receiving and providing input and output, respectively. For example, and without limitation, I/O devices 404 could include a touchscreen configured to receive input and provide output. Memory 406 may include any technically feasible storage medium for storing data and software applications. Memory could be, for example and without limitation, a random-access memory (RAM) module. Memory 406 includes a control application 408 and a datastore 410.

Control application 408 is a software application including program code that, when executed by processor 402, coordinates the operation of audio sharing system 100. In doing so, control application 408 implements transitions between the various modes of operation associated with audio sharing system 100 and manages the generation of the sound fields 120 corresponding to each such mode. In doing so, control application 408 interoperates with wearable device 420.

Wearable device 420 is configured to be worn or otherwise coupled to user 110. For example, and without limitation, wearable device 420 could be robotic hat 300 discussed above in conjunction with FIGS. 3A-3D. In some embodiments, wearable device 420 includes a mechanical subsystem 422. Mechanical subsystem 422 includes any robotic hardware configured to perform actuation operations. For example, and without limitation, mechanical subsystem 422 could include electric motors configured to actuate mechanical flaps 310 affixed to robotic hat 300. Mechanical subsystem 422 may be omitted in embodiments that do not involve mechanical actuation.

Wearable device 420 also includes I/O subsystem 424. I/O subsystem 424 includes devices configured to receive input, such as sensor arrays configured to capture sensor data associated with user 110 and/or the environment surrounding user 110. For example, and without limitation, I/O subsystem 424 could include a gyroscope configured to measure the head orientation of user 110, an inertial measurement unit (IMU) configured to measure the motion of user 110 through space, a set of acoustic transducers configured to measure ambient sound, one or more optical sensors configured to measure visual or infrared light, a Light Detection and Ranging (LIDAR) sensor, a distance sensor, a time of flight sensor, a brightness sensor, or any other technically feasible form of sensing apparatus.

I/O subsystem 424 also includes devices configured to generate output. For example, and without limitation, I/O subsystem 424 could include steerable acoustic array 300 discussed above in conjunction with FIGS. 2A-2D. I/O subsystem 424 may also include other forms of audio and/or visual output devices, including, for example and without limitation, acoustic arrays, ultrasonic devices, visual display devices, bone conduction transducers, flexible displays, beam forming speakers, optical pass through devices, heads-up displays, or any other technically feasible form of emission apparatus.

Computing device 400 and wearable device 420 may be integrated together to form a single physical component or may be separate modular components. Computing device 400 may communicate with wearable device 420 via a wired connection or a wireless connection, as well. In one embodiment, computing device 400 is a mobile device and control application 408 is an application (app) that executes on that computing device 400, potentially alongside other apps, to coordinate the operation of wearable device 420. Control application 408 is described in greater detail below in conjunction with FIG. 4B.

As shown in FIG. 4B, control application 408 includes a transition module 440, a hardware controller 450, and an audio generator 460. Transition module 440 is a software module configured to receive input, including sensor data, from I/O subsystem 424, and to then implement transitions between operating modes via interactions with hardware controller 450 and audio generator 460.

In doing so, transition module 440 analyzes the input data received from I/O subsystem 424 to detect specific triggering events. Each triggering event may correspond to a different operating mode. Transition module 440 may be preconfigured to detect a specific set of triggering events and may also be configured by user 110 to detect custom triggering events. Transition module 440 may implement any technically feasible form of data processing to detect a given triggering event.

Transition module 440 may include a voice recognition module that identifies spoken commands issued by user 110. Each different command may initiate a transition to a different operating mode. For example, and without limitation, user 110 could issue a command, such as "transition to private mode," and transition module 440 would then, in response, initiate a transition to private mode via interactions with hardware controller 450 and audio generator 450. Other triggering events may include the spoken expression of the name of user 110, the detection of a specific nearby listener, the identification of a certain dangerous circumstance, or the detection of other instances of audio sharing system 100, among others.

Transition module 440 may implement computer vision techniques to identify people or objects nearby to user 110, and then initiate a transition to an appropriate mode of operation. For example, and without limitation, when a listener 130 approaches user 110, transition module 440 could detect the presence of that listener and then initiate a transition to public mode. In another example, and without limitation, transition module 440 could detect an approaching automobile, and then transition out of private mode in order to reduce audio immersion of user 110 and/or alert user 110 to potential danger. Audio sharing system 100 may also warn user 110 of potential danger without transitioning between modes. In addition, audio sharing system 100 may perform steps to transmit warnings externally to the environment based on triggering events. For example, and without limitation, audio sharing system 100 could transmit a warning to an approaching automobile that user 110 may be pre-occupied and unaware of potential anger.

In response to any triggering event, transition module 440 may cause hardware controller 450 to implement specific mechanical actuations with mechanical subsystem 422. In doing so, hardware controller 450 may issue commands to one or more mechanical components. For example, and without limitation, when transition module 440 initiates a transition to public mode, hardware controller could actuate mechanical flaps 310 of robotic hat 300 in order to fold those flaps upwards.

In response to any triggering event, transition module 440 may also cause audio generator 460 to perform various audio processing techniques to generate audio signals for transmission to I/O subsystem 424. I/O subsystem 424 may then generate sound fields 120 based on those audio signals. Audio generator 460 may access audio library 462 to retrieve sound files, and then decode those sound fields to generate the audio signals. Audio library 462 could include, for example and without limitation, a collection of Motion Picture Experts Group-1 Audio Layer-3 (MP3) files. Audio generator 460 generally coordinates various digital signal processing techniques, and may rely on a discrete digital signal processor (not shown) to do so. Those techniques may be associated with audio beamforming, active noise cancelation, and three-dimensional (3D) sound, among others. For example, and without limitation, audio generator 460 could generate a cancelation signal that cancels selected sound at the location of a nearby listener 130.

Figure 5:
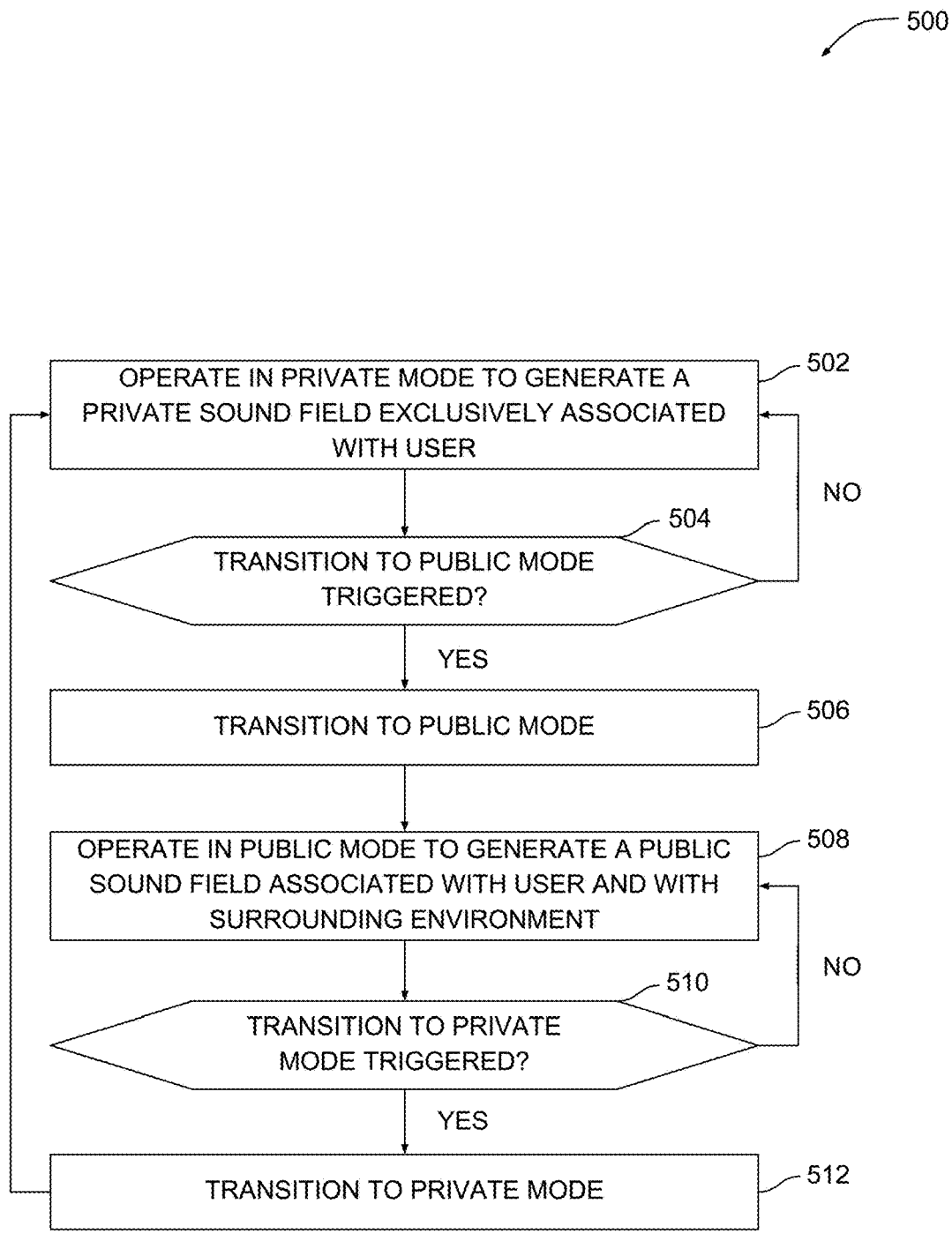
FIG. 5 is a flow diagram of method steps for transitioning between audio sharing modes, according to various embodiments.
Figure 6:
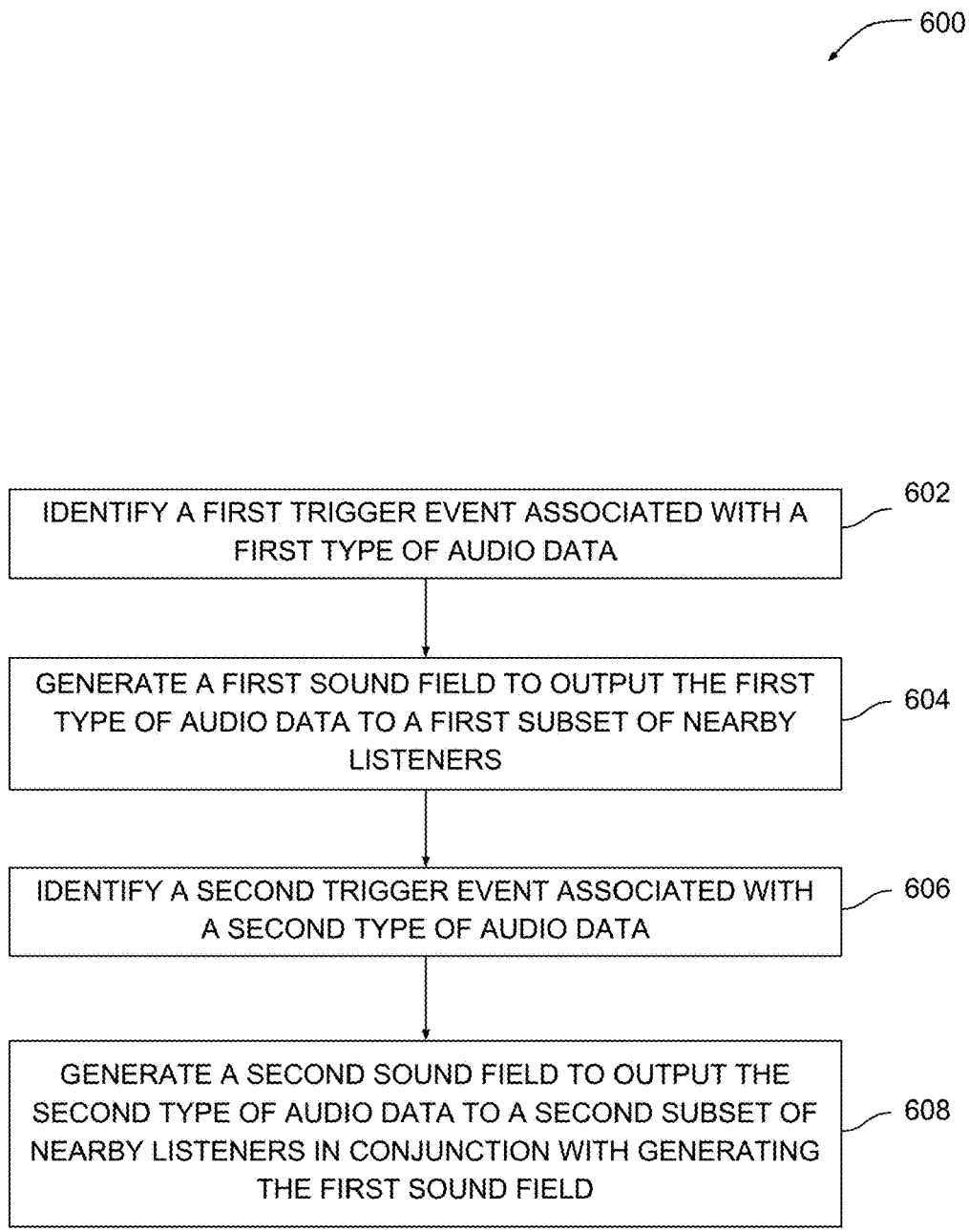
FIG. 6 is a flow diagram of method steps for operating in multiple audio sharing modes simultaneously, according to various embodiments.

Referring generally to FIGS. 4A-4B, persons skilled in the art will understand that the overarching functionality of computing device 400 and wearable device 420 may be performed according to other technically feasible implementations beyond those discussed above. For example, the functionality of computing device 400 and wearable device 420 may be implemented as a single integrated circuit embedded into a piece of clothing. As general matter, any technically feasible approach to generating the sound fields 120 shown in FIGS. 1A-1E fall squarely in the scope of the present disclosure. FIGS. 5-6 illustrate procedures implemented by audio sharing system 100 to perform the various techniques discussed thus far.

Techniques for Sharing Audio

FIG. 5 is a flow diagram of method steps for transitioning between audio sharing modes, according to various embodiments. Although the method steps are described in conjunction with the systems of FIGS. 1-4B, persons skilled in the art will understand that the method steps can be performed in any order by any system.

As shown, a method 500 begins at step 502, where audio sharing system 100 operates in private mode to generate a private sound field exclusively associated with user 110. In doing so, audio sharing system 100 may generate sound field 120(A) shown in FIG. 1A. At step 504, audio sharing system 100 determines whether a transition to public mode is triggered. Audio sharing system 100 may implement many possible criteria for determining whether to transition to public mode, and in doing so, may process data associated with user 110 and/or the environment where user 110 resides. The method 500 returns to step 502 if a transition to public mode is not triggered. Otherwise, the method 500 proceeds to step 506.

At step 506, audio sharing system 100 implements a transition to public mode. Audio sharing system 100 may implement mechanical actuations to generate sound field 120(B) and/or perform digital signal processing operations to condition audio signals for public broadcast. At step 508, audio sharing system 100 operates in public mode to generate a public sound field associated with user 100 and with the surrounding environment. Audio sharing system may generate sound field 120(B) upon transitioning to public mode, thereby sharing sound with listeners in proximity to user 110.

At step 510, audio sharing system determines whether a transition to private mode is triggered. If no such transition is triggered, the method returns to step 508 and audio sharing system 100 remains in public mode. Otherwise, the method proceeds to step 512, where audio sharing system 100 transitions back to private mode. The method 500 then returns to step 502 and proceeds as described above. Audio sharing system 100 implements the method 500 to implement the essential functionality of transitioning between private and public mode. Audio sharing system 100 may also implement a more complex approach that involves the generation of multiple sound fields simultaneously, as described in greater detail below in conjunction with FIG. 6.

FIG. 6 is a flow diagram of method steps for operating in multiple audio sharing modes simultaneously, according to various embodiments. Although the method steps are described in conjunction with the systems of FIGS. 1-4B, persons skilled in the art will understand that the method steps can be performed in any order by any system.

As shown, a method 600 begins at step 602, where audio sharing system 100 identifies a first trigger event associated with a first type of audio data. The first trigger event may be associated with user 110 or the environment where user 110 resides. The first trigger event may also be associated with a specific type of audio data. For example, and without limitation, the first trigger event could be associated with a specific voice command issued by user 110 indicating that a first audio file should be played. At step 604, audio sharing system 100 generates a first sound field to output the first type of audio data to a first subset of nearby listeners. The first subset of listeners may include user 110 and specific other listeners 130, a subset of listeners 130 that does not include user 110, or user 110 alone.

At step 606, audio sharing system 100 identifies a second trigger event associated with a second type of audio data. Similar to the first trigger event, the second trigger event may be associated with user 110 or the environment where user 110 resides, and may also be associated with a specific type of audio data. For example, and without limitation, the second trigger event could be associated with an environmental cue that triggers music to be broadcast into the environment. At step 608, audio sharing system 100 generates a second sound field to output the second type of audio data to a second subset of nearby listeners in conjunction with generating the first sound field. The second subset of listeners may include listeners in the first subset or may include a distinct set of listeners.

The approach described above allows audio sharing system 100 to operate in multiple modes of operation simultaneously. For example, and without limitation, audio sharing system 100 could generate the first sound field for user 110 only, thereby operating in private mode to output the first type of audio data, and generate the second sound field for multiple nearby listeners, thereby also operating in public mode to output the second type of audio data.

Although the techniques discussed thus far relate to sharing sound via acoustic transmissions, persons skilled in the art will understand that sound may also be shared digitally. For example, and without limitation, when operating in public mode, audio sharing system 100 could stream digital audio signals to selected mobile devices associated with nearby listeners. With this approach, audio sharing system 100 can avoid broadcasting acoustic signals into the environment while still permitting audio to be shared across many listeners.

In sum, an audio sharing system is configured to operate in at least two modes of operation. In a private mode, the audio sharing system outputs sound only to a user and may isolate the user from the surrounding acoustic environment. In a public mode of operation, the audio sharing system broadcasts sound to the user and to any other listeners in proximity to the user, thereby sharing sound in a social manner. The audio sharing system may also operate in other modes of operation that allow the selective sharing of sounds.

One advantage of the techniques described herein is that users of the audio sharing system can listen to sound in isolation from others at some times, and selectively share sound with nearby listeners at other times. Accordingly, the disclosed audio sharing system represents a technological advancement over conventional approaches that cannot easily facilitate the sharing of sound with others.

1. Some embodiments include a computer-implemented method for distributing sound between listeners, the method comprising: configuring one or more acoustic transducers to operate in a first mode, wherein, in the first mode, the one or more acoustic transducers generate a first sound field in which sound is output towards a first listener and away from a second listener, transitioning the one or more acoustic transducers from the first mode to a second mode in response to a first triggering event, and configuring the one or more acoustic transducers to operate in the second mode, wherein, in the second mode, the one or more acoustic transducers generate a second sound field in which sound is output towards the first listener and the second listener.

2. The computer-implemented method of clause 1, wherein, in the first mode, the one or more acoustic transducers generate the first sound field in which sound is output away from a third listener, and wherein, in the first mode, the one or more acoustic transducers generate the second sound field in which sound is output away from the third listener.

3. The computer-implemented method of any of clauses 1 and 2, further comprising configuring the one or more acoustic transducers to operate in a third mode, wherein, in the third mode, the one or more acoustic transducers generate a third sound field in which sound is output towards the second listener and away from the first listener.

4. The computer-implemented method of any of clauses 1, 2, and 3, wherein the first sound field and the second sound field are generated simultaneously.

5. The computer-implemented method of any of clauses 1, 2, 3, and 4, wherein the first sound field is associated with a first audio source and the second sound field is associated with a second audio source.

6. The computer-implemented method of any of clauses 1, 2, 3, 4, and 5, wherein configuring the one or more acoustic transducers to operate in the first mode comprises performing a beamforming operation to focus sound towards the first listener and away from the second listener.

7. The computer-implemented method of any of clauses 1, 2, 3, 4, 5, and 6, wherein configuring the one or more acoustic transducers to operate in the first mode comprises performing an active noise cancelation operation to cancel a first portion of sound at a location associated with the second listener.

8. The computer-implemented method of any of clauses 1, 2, 3, 4, 5, 6, and 7, further comprising detecting the first triggering event based on sensor data associated with the first listener or based on sensor data associated with an environment in which the first listener resides.

9. Some embodiments include a non-transitory computer-readable medium that, when executed by a processor, causes the processor to distribute sound between listeners by performing the steps of: configuring one or more acoustic transducers to operate in a first mode, wherein, in the first mode, the one or more acoustic transducers generate a first sound field in which sound is output towards a first listener and away from a second listener, initiating a second mode of operation in response to a first triggering event, and configuring the one or more acoustic transducers to operate in the second mode, wherein, in the second mode, the one or more acoustic transducers generate a second sound field in which sound is output towards the first listener and the second listener in conjunction with generating the first sound field.

10. The non-transitory computer-readable medium of clause 9, wherein the first sound field is associated with a digital assistant that is responsive to the first listener, and the second field is derived from a first music file associated with the first listener.

11. The non-transitory computer-readable medium of any of clauses 9 and 10, wherein the step of initiating the second mode of operation comprising transmitting one or more commands to a mechanical subsystem to cause the second sound field to be generated.

12. The non-transitory computer-readable medium of any of clauses 9, 10, and 11, wherein the step of initiating the second mode of operation comprising causing an audio generator to perform a digital signal processing computation to generate a first audio signal, wherein the second sound field is derived from the first audio signal.

13. The non-transitory computer-readable medium of any of clauses 9, 10, 11, and 12, wherein the first triggering event comprises detection of a first voice command issued by the first listener and corresponding to the second mode of operation.

14. The non-transitory computer-readable medium of any of clauses 9, 10, 11, 12, and 13, wherein the first sound field is generated to associate sound with a first object in an environment where the first listener resides, and further comprising causing the first sound field to remain associated with the first object when the first listener moves through the environment.

15. The non-transitory computer-readable medium of any of clauses 9, 10, 11, 12, 13, and 14, further comprising the step of causing the one or more transducers to generate a first sound sampled from an environment in which the first listener resides to output sound towards the first listener.

16. Some embodiments include a system for distributing sound between listeners, comprising: a wearable device configured to be worn by a first listener, comprising: an input/output (I/O) subsystem that includes a sensor array and a speaker array, and a computing device, comprising: a memory storing a control application, and a processor that, when executing the control application, is configured to perform the steps of: configuring the speaker array to operate in a first mode, wherein, in the first mode, the speaker array generates a first sound field in which sound is output towards a first listener and away from a second listener, transitioning the speaker array from the first mode to a second mode in response to a first triggering event, and configuring the speaker array to operate in the second mode, wherein, in the second mode, the speaker array generates a second sound field in which sound is output towards the first listener and the second listener.

17. The system of clause 16, wherein the wearable device further comprises a mechanical subsystem configured to actuate the speaker array to transition from the first mode of operation to the second mode of operation.

18. The system of any of clauses 16 and 17, wherein the mechanical subsystem actuates the speaker array to be directed towards the first listener when operating in the first mode of operation, and actuates the speaker array to be directed towards the second listener to operate in the second mode of operation.

19. The system of any of clauses 16, 17, and 18, wherein the wearable device comprises a hat, the speaker array is embedded into an ear flap of the hat, and the mechanical subsystem raises and lowers the earflap when transitioning between modes of operation.

20. The system of any of clauses 16, 17, 18, and 19, wherein the wearable device comprises a neck-mounted device, and the speaker array comprises a steerable speaker array configured to generate a plurality of directional sound fields corresponding to a plurality of different modes of operation.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for distributing sound between listeners, the method comprising:
configuring one or more acoustic transducers to operate in a first mode, wherein, in the first mode, the one or more acoustic transducers generate a first sound field in which sound is output towards a first listener and away from a second listener;
transitioning the one or more acoustic transducers from the first mode to a second mode in response to a first triggering event based on identifying at least one of the second listener or a first object that is near the first listener; and
configuring the one or more acoustic transducers to operate in the second mode, wherein, in the second mode, the one or more acoustic transducers generate a second sound field in which sound is output towards the first listener and the second listener, wherein the one or more acoustic transducers are included in a wearable device worn by the first listener.

2. The computer-implemented method of claim 1, wherein, in the first mode, the one or more acoustic transducers generate the first sound field in which sound is output away from a third listener, and wherein, in the second mode, the one or more acoustic transducers generate the second sound field in which sound is output away from the third listener.

3. The computer-implemented method of claim 1, further comprising configuring the one or more acoustic transducers to operate in a third mode, wherein, in the third mode, the one or more acoustic transducers generate a third sound field in which sound is output towards the second listener and away from the first listener.

4. The computer-implemented method of claim 1, wherein the first sound field and the second sound field are generated simultaneously.

5. The computer-implemented method of claim 1, wherein the first sound field is associated with a first audio source and the second sound field is associated with a second audio source.

6. The computer-implemented method of claim 1, wherein configuring the one or more acoustic transducers to operate in the first mode comprises performing a beamforming operation to focus sound towards the first listener and away from the second listener.

7. The computer-implemented method of claim 1, wherein configuring the one or more acoustic transducers to operate in the first mode comprises performing an active noise cancellation operation to cancel a first portion of sound at a location associated with the second listener.

8. The computer-implemented method of claim 1, further comprising detecting the first triggering event based on sensor data associated with the first listener or based on sensor data associated with an environment in which the first listener resides.

9. One or more non-transitory computer-readable media that, when executed by one or more processors, causes the one or more processors to distribute sound between listeners by performing the steps of:
configuring one or more acoustic transducers to operate in a first mode, wherein, in the first mode, the one or more acoustic transducers generate a first sound field in which sound is output towards a first listener and away from a second listener;
initiating a second mode in response to a first triggering event based on identifying at least one of the second listener or a first object that is near the first listener; and
configuring the one or more acoustic transducers to operate in the second mode, wherein, in the second mode, the one or more acoustic transducers generate a second sound field in which sound is output towards the first listener and the second listener in conjunction with generating the first sound field, wherein the one or more acoustic transducers are included in a wearable device worn by the first listener.

10. The one or more non-transitory computer-readable media of claim 9, wherein the first sound field is associated with a digital assistant that is responsive to the first listener, and the second sound field is derived from a first music file associated with the first listener.

11. The one or more non-transitory computer-readable media of claim 9, wherein the step of initiating the second mode comprises transmitting one or more commands to a mechanical subsystem to cause the second sound field to be generated.

12. The one or more non-transitory computer-readable media of claim 9, wherein the step of initiating the second mode comprises causing an audio generator to perform a digital signal processing computation to generate a first audio signal, wherein the second sound field is derived from the first audio signal.

13. The one or more non-transitory computer-readable media of claim 9, wherein the first triggering event comprises detection of a first voice command issued by the first listener and corresponding to the second mode.

14. The one or more non-transitory computer-readable media of claim 9, wherein the first sound field is generated to associate sound with a second object in an environment where the first listener resides, and further comprising causing the first sound field to remain associated with the second object when the first listener moves through the environment.

15. The one or more non-transitory computer-readable media of claim 9, further comprising the step of causing the one or more acoustic transducers to generate a first sound sampled from an environment in which the first listener resides to output sound towards the first listener.

16. A system for distributing sound between listeners, comprising:

a wearable device configured to be worn by a first listener, comprising: an input/output (I/O) subsystem that includes a sensor array and a speaker array, and a computing device, comprising:

a memory storing a control application, and a processor that, when executing the control application, is configured to perform the steps of:

configuring the speaker array to operate in a first mode, wherein, in the first mode, the speaker array generates a first sound field in which sound is output towards a first listener and away from a second listener;

transitioning the speaker array from the first mode to a second mode in response to a first triggering event based on identifying at least one of the second listener or a first object that is near the first listener; and configuring the speaker array to operate in the second mode, wherein, in the second mode, the speaker array generates a second sound field in which sound is output towards the first listener and the second listener.

17. The system of claim 16, wherein the wearable device further comprises a mechanical subsystem configured to actuate the speaker array to transition from the first mode to the second mode.

18. The system of claim 17, wherein the mechanical subsystem actuates the speaker array to be directed towards the first listener when operating in the first mode and actuates the speaker array to be directed towards the second listener to operate in the second mode.

19. The system of claim 18, wherein the wearable device comprises a hat, the speaker array is embedded into an ear flap of the hat, and the mechanical subsystem raises and lowers the ear flap when transitioning between modes of operation.

20. The system of claim 16, wherein the wearable device comprises a neck-mounted device, and the speaker array comprises a steerable speaker array configured to generate a plurality of directional sound fields corresponding to a plurality of different modes of operation.

* * * * *